July 22, 1952  J. V. McNULTY ET AL  2,604,516
ELECTRICAL CIRCUIT ANALYZING APPARATUS
Filed Sept. 27, 1947
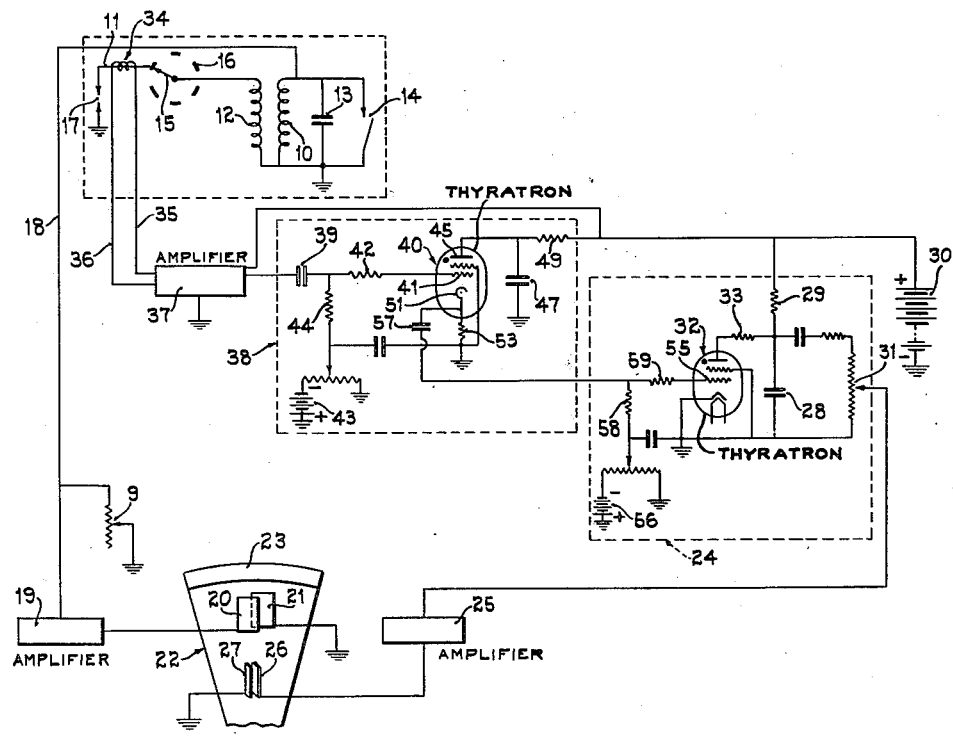
INVENTORS.
John V. Mc Nulty
Lewis J. Knudson
BY
Dale A. Bauer
ATTORNEY.

Patented July 22, 1952

2,604,516

UNITED STATES PATENT OFFICE 2,604,516

ELECTRICAL CIRCUIT ANALYZING APPARATUS

John V. McNulty and Lewis I. Knudson, Sidney, N. Y., assignors to Bendix Aviation Corporation, New York, N. Y., a corporation of Delaware Application September 27, 1947, Serial No. 776,436

5 Claims. (Cl. 175—183)

This invention relates to electronic apparatus of a type which is particularly adapted for use in testing or analyzing the operation of electrical circuits such as, for example, the ignition circuits of an internal combustion engine or the like.

One of the objects of the present invention is to provide novel means for investigating the operation and efficiency of an electrical circuit such as the ignition system of an engine during and without appreciable interference with the normal operation thereof.

Another object of the invention is to provide novel apparatus for conveniently and quickly testing and analyzing the operation of a plurality of electrical circuits adapted to be periodically connected to a common source of electrical energy.

Still another object is to provide novel apparatus of the above character whereby one is enabled to obtain visible indications which represent energy variations in an electrical circuit that are in turn indicative of departures from normal or proper operation.

A further object is to provide apparatus of the oscillograph type for investigating the operation of electrical circuits wherein novel means are provided for synchronizing the time base of the oscillograph with the cyclical operation of the circuit under observation.

A still further object is to provide novel means in apparatus of the above character for controlling the sweep generator in such a manner as to substantially prevent a division of the image of any signal pulse or oscillation when one of the latter is employed as the triggering means for said generator.

Another object is to provide novel apparatus for producing visible indications, the form or nature of which will enable an operator to detect and locate imperfections in various elements of an electrical circuit or system, often before the same become fatal to satisfactory or continued operation of the circuit.

Another object is to provide novel means for controlling the time base or horizontal sweep of a cathode ray oscillograph when the same is used, for example, for investigating the operation of an internal combustion engine or the like.

The above and further objects and novel features of the invention will more fully appear from the following detailed description when the same is read in conjunction with the accompanying drawing. It is to be expressly understood, however, that the drawings are for the purpose of illustration only and are not intended as a definition of the limits of the invention, reference for this latter purpose being had primarily to the appended claims.

In the drawing, the single figure is a diagrammatic illustration of one form of apparatus embodying the invention, the same being shown in conjunction with a known type of ignition system for internal combustion engines.

A conventional high tension distribution ignition system for an internal combustion engine is illustrated in the drawing, by way of example, as comprising a magneto generator having a transformer coil that consists of a primary winding 10 and a secondary winding 12. Connected across the primary winding is a condenser 13 and a circuit breaker 14 that is adapted to be periodically actuated in a known manner by a cam or other conventional means (not shown). Electrical energy may be generated in the primary winding by a multipole magnetic rotor (not shown) or any other suitable means well known in the art. The high potential or ungrounded end of secondary winding 12 is connected to the rotating electrode 15 of a suitable known type of ignition distributor which has a plurality of circularly disposed output terminals 16 that cooperate with electrode 15 in a known manner to distribute the generated energy of the magneto to a plurality of branch circuits in a predetermined sequence. Each of the terminals 16 is connected by means of a lead 11 to a spark plug 17 in one of the engine cylinders.

In operation, the circuit breaker 14 is opened each time that a flow of current is built up in primary winding 10 thereby causing the induction of a high tension voltage in secondary winding 12 at a time when the latter is connected through a pair of distributor contacts 15, 16 to one of the engine spark plugs 17. The parts of the ignition system described above may be in the form of any well known construction and hence, it is believed that the same need not be described and illustrated in more detail, particularly since such structures, per se, do not constitute a part of the present invention. It will be understood, of course, that the entire ignition system or any of its parts may be radio-shielded in any known or conventional manner and that the invention is equally applicable to dual ignition engines and to systems embodying low tension distribution.

For the purpose of analyzing the operation of the various circuits including the different spark plugs and circuits therefore in the above described ignition system, means are provided whereby the variable output of the magneto generator is employed in conjunction with a cathode ray type of oscillograph for generating saw tooth signals which are synchronized with the cyclical operation of the circuit to provide a horizontal sweep during each revolution of the rotary distributor electrode 15. Thus, in each horizontal sweep of the electrode ray of the oscillograph, there occurs on the screen of the latter an informative signal concerning each spark plug circuit in the sequence in which such circuits are energized. In the embodiment illustrated, the ungrounded or high potential end of magneto primary winding 10 is connected through a lead 18 and a suitable amplifier 19 to the vertical deflection plates 20, 21 of a cathode ray tube 22 (only partially shown) which may be of any suitable known construction. The variable voltage impressed upon the plates 20, 21 during operation of the magneto is effective to cause a corresponding vertical deflection of the electron ray projected between said plates and upon the screen 23 to produce a visible indication of the current or voltage variations in the ignition circuits.

It may be noted that the voltage variations in the primary winding 10 are representative or indicative of what takes place electrically in the spark plug circuit which is connected to the secondary winding at the instant of observation. It will be understood that the signals or electrical oscillations impressed upon plates 20, 21 may be obtained in other ways, such as by connecting said plates to the high tension or secondary winding 12. In some installations these signals may be caused to be representative of the gaseous pressures in the cylinders, oil pressures, or the like, which are indicative of proper engine operation when properly analyzed. In either event, the signals will be representative of the electrical happenings in the circuit under investigation. In the illustrated embodiment, the circuit constants can be so selected that the testing apparatus will drain only an insignificant amount of energy from the ignition system so that the normal operation of the latter will not be appreciably affected.

For a purpose to be more fully and specifically hereinafter described, means are provided for progressively loading the primary circuit of the magneto, or other source of energy, to thereby vary the energy delivered to the spark plug circuits. In the form shown said means comprises a variable resistance or rheostat 9 connected in shunt with primary winding 10 and adapted for adjustment manually or by any suitable means. During normal operation of the ignition system, rheostat 9 may be set at maximum resistance or, if desired, the circuit therethrough may be opened. The lower the resistance setting of the rheostat the greater will be the amount of generated energy which will be shunted away from the spark plug circuits.

For the purpose of providing a horizontal time base for the saw-tooth sweep of the oscillograph, a sweep generator 24 is connected through a suitable amplifier 25 for applying a continuously varying voltage across horizontal deflection plates 26, 27 of tube 22. Said sweep generator, in the form illustrated, comprises a storage condenser 28 connected preferably in series with a current limiting resistance 29, across a suitable source of direct current energy, such as a battery 30. Condenser 28 is operably connected with amplifier 25 and hence with horizontal deflection plates 26, 27 through a variable resistance or voltage divider 31 which is commonly known as a gain control in association with an oscillograph and operates in a known manner for regulating the horizontal time base of the cathode ray tube 22. By means of this control the time base or horizontal sweep of the electron ray of tube 22 may be maintained relatively close to a predetermined value independently of the speed of the engine and hence, of the frequency of the cyclically occurring signals impressed on the vertical deflection plates 20, 21 by the successive energization of the spark plug circuits. By thus maintaining the amplitude of the horizontal sweep constant, or nearly constant, at all engine speeds, the horizontal spacing of the signal indications or images representing operation of the various spark plug circuits will be relatively constant and the same will have a similar contour and amplitude at all speeds or frequencies without affecting or changing the number or order of the indications or images in each sweep or cycle of signals. If desired, the gain control means 31 may be automatically operated or controlled in any suitable known manner in accordance with changes in engine speed, the frequency of the signals being observed, or other variable factor.

As voltage builds up on condenser 28, a corresponding or substantially proportional variation of voltage is impressed on the horizontal deflection plates 26, 27 of the cathode ray tube 22, thereby causing horizontal deflection or movement of the electron beam projecting between said plates and plates 20, 21. An electronic control tube or valve 32, such as a thyratron (2D21) is connected across condenser 28, and preferably but not necessarily a resistance 33, for permitting the condenser to discharge when the valve is rendered conductive by suitable triggering or tripping means to be hereinafter described. When condenser 28 discharges and the voltage across the same drops, the electron ray in tube 22 is permitted to return to a horizontal reference position which may be at the left edge of screen 23 as viewed by an observer. As a charge again builds up on condenser 28, after the healing of tube 32, said ray is deflected horizontally in a manner well understood in the art, the speed of deflection being determined by the rate at which the voltage builds up on condenser 28 and the setting of the gain control device 31.

In order that the signal indication or image of oscillations in any given spark plug circuit will occur in the same position in the series of images traced during each sweep of the oscillograph ray, and hence be immediately and accurately identifiable, the sweep generator is preferably triggered by a signal pulse initiated by a selected one of the spark plug circuits or some other suitable source of periodic signal or event which occurs in synchronism with the energization of a selected one of the spark plug circuits. In this way the initial indication or image in each sweep will represent a selected spark plug circuit and the signals representing the other spark plug circuits will occur in a predetermined sequence thereafter. Since, as pointed out above, the amplitude of the horizontal sweep may be maintained relatively constant, independently of the cyclic speed of operation, suitable identifying numerals or letters may be placed on the oscillograph screen 23 to associate each signal indication or image with the particular spark plug circuit which it represents.

The periodic impulse for triggering sweep generator valve 32 is obtained through a suitable signal pick-up device associated with a selected spark plug lead 11. In the illustrated embodiment, a magnetic or inductive type of pick-up device 34 is employed although a capacity (electrostatic) type or voltage divider type may be satisfactorily employed in some installations. The signal pick-up device, which is only diagrammatically shown, may comprise a magnetic flux conducting core (not shown) surrounding conductor 11 and having the pick-up coil wound thereon. The coil is shown as being connected by leads 35 and 36 to a suitable amplifier 37, but it will be understood that one end of the pick-up coil may be connected to ground, if desired. Thus, each time the selected spark plug 17 fires there is a surge of current in the lead 11 with which the pick-up device is associated, the effect of which is to induce a voltage across the pick-up coil 34. By reason of the combination of the inductance of coil 34, the distributed capacity across the same and the distributed capacity between leads 35, 36 the pick-up circuit is a tuned circuit which is shocked into oscillation at its own natural frequency by the surge of energy in conductor 11. It has been found suitable to provide a pick-up circuit having a natural frequency between 10,000 and 20,000 cycles/sec. A high frequency is desirable but as the length of leads 35, 36 increases lower frequencies may be used to insure an adequate output voltage for satisfactory operation of other elements to be described. The oscillations in the pick-up circuit should be of sufficient magnitude so that use can be made of the first positive oscillation or voltage rise of each pulse or signal without any appreciable time lapse following the beginning of the surge of current in lead 11 referred to above.

The output of amplifier 37, upon which the oscillations in the pick-up circuit are impressed, is fed into a pulse former or generator 38 for controlling the operation thereof, the connection preferably being through a condenser 39 which blocks any D. C. components. The pulse-former is employed in a novel manner to control the triggering of sweep generator tube 32 and to thus substantially obviate any possibility of said tube being triggered more than once in response to each or any oscillatory signal in the pick-up circuit. The novel arrangement also insures prompt healing of tube 32 following each triggering action thereof. Additionally, the use of the pulse former, in a novel manner to be next described, obviates any undesirable delay between the start of the current surge in lead 11 and the triggering of sweep generator valve 32 to thereby avoid any material division of one of the signals on screen 23 between the beginning and the end of the horizontal sweep.

The pulse former in the illustrated embodiment comprises a gaseous control tube or electronic valve 40, such as a thyratron (2D21), the control grid 41 of which is connected with the output of amplifier 37 through condenser 39 and an optional protective resistance 42. Grid 41 is also negatively biased in any suitable well known manner such as by a biasing battery 43 through a suitable grid resistor 44. The plate electrode 45 is connected to the high potential or ungrounded side of a storage condenser 47 that is in turn connected through a resistance 49 to the ungrounded terminal of battery 30. Cathode 51 is connected to ground through a resistance 53 and to the control grid 55 of sweep generator tube 32 through a condenser 57 and an optional protective resistance 59. A charge is normally maintained on condenser 57 by connecting the same through a relatively large resistance, such as .2 to 5 megohms, to a battery 56 thereby providing a cut-off bias to grid 55 of tube 32 which supplements the bias applied to the grid by the battery. In one operative embodiment the condenser 57 has a capacity of about .05 microfarad and resistor 53 has a value of from 200 to 1000 ohms.

Condenser 47 is continuously subjected to the charging action of source 30 so that whenever tube 40 is triggered, i. e., rendered conductive, as a result of the energization of the pick-up device 34, said condenser discharges through the tube. This discharge results in a momentary difference of potential across resistance 53, said difference being conveyed through condenser 57 to the grid 55 of tube 32, thereby momentarily removing the bias voltage normally applied thereto by battery 56 so as to render the tube conductive to the charge on condenser 28. The discharge of the latter condenser has the effect heretofore described, of causing the return of the electron beam of tube 22 to a horizontal reference position.

The pulse former circuit constants are preferably such that condenser 47 will become fully charged during each cycle of operation of the circuit under investigation, but such that its charging rate is too low to enable it to trigger tube 32 more than once during each cycle irrespective of the condition of tube 40 immediately after the same is initially tripped in the manner heretofore described. In other words, it is preferable that any charge on condenser 47 less than a full charge will be insufficient to trip tube 32. Attainment of this optimum of operation may in some instances be dependent upon the magnitude of the range of the cyclic frequency of the circuit under investigation. If said frequency varies, the constants of the elements of the pulse generator are governed by the higher frequency. Thus, if tube 40 is triggered more than once by a given signal oscillation from the pick-up device, or if said tube is prevented by the nature of the oscillation from healing promptly after triggering, the triggering and healing of tube 32 will not be thereby adversely affected. Additionally, tube or valve 40 may be made sufficiently sensitive to be responsive with certainty and without appreciable time lapse to the first peak or oscillation of each oscillatory signal in the pick-up circuit, thereby insuring good and constant synchronization of the oscillograph time base or horizontal sweep with the cyclic functioning of the circuit under investigation and observation.

In one suitable embodiment for use in examining ignition systems of high powered aircraft engines, a condenser 47 having a capacity of .01 microfarad and a resistor 49 having a resistance of .2 megohm have been found to be satisfactory. In that same embodiment the condenser 28 had a capacity of .1 microfarad and the resistor 29 had a value of 5.1 megohms. Accordingly, the charging rate of condenser 28 is lower than that of condenser 47, the former being designed to be discharged during each cycle before becoming fully charged. The operating range of condenser 28 is so chosen that operation will be over a relatively straight portion of its voltage curve thereby causing the electron beam of tube 22 to move horizontally at a relatively constant speed for a given setting of gain control device 31. It will be understood that the above-mentioned electrical values are only approximate and not critical.

When the ignition system of an engine or a similar circuit is being investigated, valuable information may sometimes be obtained by progressively reducing the energy supplied to the circuit or system by the source of energy. If the supplied energy is diminished to the point that defective or imperfect operation results, the cause of such failure may be determined by the form of images on screen 23 and remedial action can be taken. Such a test may very often disclose a condition which constitutes the foundation of an imminent failure even at normal or full power operation. Thus, by loading the magneto primary 10 in the illustrated embodiment by means of the variable resistance 9, it is often possible to locate partially fouled spark plugs and other weaknesses which may be about to cause ignition failures.

In operation, the varying voltage of the primary circuit of the magneto varies through a complete voltage transient during the energization of each spark plug circuit and is affected in a determinable manner by each of various types of defects in the system, such as defects in the leads, spark plugs, distributor, coils, circuit breaker, or other parts of the system. An image representative of the voltage variations between the energization of successively energized spark plug circuits is created on the screen 23 by causing a cathode ray beam in tube 22 to move vertically between plates 20, 21 in accordance with said voltage variations. Said beam is caused to move simultaneously in a horizontal direction by the application of independently generated rising voltage (the charge on condenser 28) to horizontal deflection plates 26, 27. A visible image or pattern is thus traced on screen 23 by the electron beam during each cycle of engine operation. The complete image on the screen during normal engine operation comprises a series of identifiable vertical oscillations of the electron beam, each of which represents the voltage changes during the energization of a determinable spark plug circuit which may be identified on the screen by a numeral or other suitable means.

In order to periodically permit the electron beam of tube 22 to return to a horizontal reference position and thus reduce the required size of the screen to a practical minimum, the charge on condenser 28 is dissipated by discharging the condenser each time a selected spark plug circuit is energized. When the selected spark plug circuit is energized an oscillatory pulse is created in the circuit of pick-up device 34. This pulse is effective to immediately render the electronic valve 40 of the pulse former 38 conductive to the charge on condenser 47. The discharge of the latter through tube 40 is effective in the manner heretofore described to render electronic valve 32 conductive to the charge on condenser 28. When this condenser discharges, the amplified voltage impressed upon horizontal deflection plates 26, 27 drops and the electron beam returns to its horizontal reference position. Thus, during each horizontal sweep of the electron beam in tube 22, an image for each of the spark plug circuits during a complete cycle of operation of the engine is traced upon screen 23. The amplitude of the horizontal sweep of the beam may be maintained relatively constant by adjustment of gain control device 31, irrespective of the frequency with which valve 32 is triggered or rendered conductive to the charge on condenser 28.

There is thus provided novel apparatus for investigating and analyzing electrical circuits such as those embodied in the ignition system of an internal combustion engine or in a system embodying a plurality of successively energized circuits, such as the spark plug circuits of an ignition system. The apparatus comprehended provides a reliable means for producing visual indications of voltage changes in the various circuits in a predetermined sequence and in predetermined positions on a screen, or the like, independently of the frequency or repetition rate at which said circuits are energized. Novel means are provided also whereby accurate synchronization between the oscilloscope and the operation of the circuit under investigation is obtained. Apparatus embodying the invention may be inexpensively constructed and embodied in a sufficiently small space to make the same practical for installations on aircraft and other vehicles which embody internal combustion engines. The device is adapted for the investigation of an ignition system or the like without appreciably interfering with normal operation thereof.

Although only one embodiment of the invention has been illustrated in the accompanying drawing and described in detail in the foregoing specification, it is to be expressly understood that the invention is not so limited. For example, different types of electronic valves having the same function or being capable of performing the same functions as the types herein mentioned, might be used. The electrical valves mentioned as being suitable for some of the elements are exemplary only and may be varied in instruments for use with different circuits. The principles of the invention might also be applied in conjunction with other types of oscillographs. Various other changes might also be made in the details of construction as well as in the arrangement of the parts illustrated without departing from the spirit and scope of the invention as will now be understood by those skilled in the art. For a definition of the limits of the invention, reference is had primarily to the appended claims.

What is claimed is:

1. In apparatus of the class described, an oscillograph, a sweep generator comprising a normally non-conductive electronic valve for controlling the horizontal sweep of said oscillograph, and means for synchronizing the horizontal sweep with an intermittently recurring event in an electrical circuit, said means including a circuit operative in response to one of said events, an electronic valve adapted to be rendered conductive upon the energization of said last-named circuit, a storage condenser, a source of energy for charging said condenser, the latter being adapted to discharge when said second-named valve is rendered conductive, and the cathode of said second-named valve being connected with the grid of said first-named valve through a condenser, whereby said first-named valve is rendered conductive upon discharge of said first-named condenser through said second-named valve.

2. Apparatus for analyzing an internal combustion engine ignition circuit having a source of alternating current and a distributor for directing said current to a plurality of branches of said circuit in predetermined sequence, said apparatus comprising an oscillograph, means for connecting said oscillograph to said source to cause the same to produce indications representing voltage variations in said circuit, and means for synchronizing the time base of said oscillograph with the frequency of energization of one of said branches, said last-named means including a tuned circuit inductively coupled to said one branch, a pulse former comprising a normally non-conductive electronic valve having its cathode connected to ground through a resistance and adapted to be rendered conductive upon excitation of said tuned circuit and a condenser adapted to discharge through said valve when the latter is thus rendered conductive, a sweep generator comprising a normally non-conductive electronic valve and a storage condenser adapted to discharge through said valve when the same is rendered conductive, a source of electrical energy for continuously charging said condensers, means for applying a biasing voltage to the control grid of said second-named valve, and means including a condenser for connecting the cathode of said first-named valve to said control grid.

3. Apparatus for analyzing an electrical circuit having a source of electrical current and a distributor for directing said current to a plurality of branches of said circuit in predetermined sequence, said apparatus comprising a cathode ray oscillograph, means for connecting the vertical deflection means of said oscillograph to said source to cause the same to produce indications representing voltage variations in said circuit and means for synchronizing the time base of said oscillograph with the frequency of energization of a selected one of said branches, said last-named means including a tuned circuit operative in response to energization of said selected branch, an electronic pulse former comprising a first condenser, means for continuously charging said condenser at a sufficiently high rate to insure attainment thereby of a predetermined minimum charge between successive energizations of said selected branch and a first normally non-conductive electronic valve having its plate connected to said condenser, its cathode connected to ground through a resistance and its control grid connected with said tuned circuit whereby said first valve is rendered conductive to said predetermined minimum charge on said first condenser by the initial positive voltage surge in said tuned circuit upon each energization of said selected branch, an electronic sweep generator comprising a second normally non-conductive electronic valve and a second storage condenser operatively connected with the plate of said second valve and with the horizontal deflection means of said oscillograph, said second condenser being connected with said charging means and chargeable thereby at a rate to insure the attainment of less than a full charge on said second condenser between successive energizations of said selected branch, means for applying a biasing voltage to the control grid of said second valve, and a single connection including a condenser for electrically connecting the control grid of said second valve to the cathode of said first valve at the high potential end of said resistance.

4. Apparatus as defined in claim 3 including a resistance in said single connection between the condenser in the latter and the control grid of said second valve.

5. Apparatus as defined in claim 3 comprising voltage amplifying means connected between said tuned circuit and the control grid of said first valve.

JOHN V. McNULTY.
LEWIS I. KNUDSON.

REFERENCES CITED

The following references are of record in the file of this patent:

UNITED STATES PATENTS

| Number | Name | Date |
| --- | --- | --- |
| Re. 22,672 | Shumard | Aug. 28, 1945 |
| 2,092,887 | Luck | Sept. 14, 1937 |
| 2,142,541 | Vogel | Jan. 3, 1939 |
| 2,233,948 | Kock | Mar. 4, 1941 |
| 2,288,554 | Smith, Jr. | June 30, 1942 |
| 2,335,780 | McCoy | Nov. 30, 1943 |
| 2,350,069 | Schrader et al. | May 30, 1944 |
| 2,355,363 | Christaldi | Aug. 8, 1944 |
| 2,359,572 | McWhirter et al. | Oct. 3, 1944 |
| 2,360,857 | Eldredge | Oct. 24, 1944 |
| 2,366,355 | Roberts | Jan. 2, 1945 |
| 2,428,149 | Falk | Sept. 30, 1947 |
| 2,428,617 | Dickinson | Oct. 7, 1947 |
| 2,471,968 | McCullough | May 31, 1949 |

FOREIGN PATENTS

| Number | Country | Date |
| --- | --- | --- |
| 563,502 | Great Britain | Aug. 17, 1944 |